United States Patent [19]

Padovani

[11] Patent Number: 5,118,277
[45] Date of Patent: Jun. 2, 1992

[54] APPARATUS FOR FORMING THE EDGE OF CONTAINERS OF SYNTHETIC THERMOPLASTIC MATERIAL

[75] Inventor: Pietro Padovani, Verona, Italy
[73] Assignee: O.M.V. SpA, Parona, Italy
[21] Appl. No.: 599,160
[22] Filed: Oct. 17, 1990
[51] Int. Cl.[5] ............................................. B29C 53/00
[52] U.S. Cl. .................................... 425/384; 425/397; 425/398; 425/403.1; 425/423
[58] Field of Search ............ 425/383, 384, 385, 387.1, 425/394, 395, 397, 398, 399, 402, 403.1, 423

[56] References Cited

U.S. PATENT DOCUMENTS

| | | | |
|---|---|---|---|
| 3,183,291 | 5/1965 | Miller et al. | 425/394 |
| 3,271,503 | 9/1966 | Shelby | 425/397 |
| 3,339,005 | 8/1967 | Brown et al. | 425/384 |
| 3,358,331 | 12/1967 | Weber | 425/384 |
| 3,548,457 | 12/1970 | Kulig | 425/384 |
| 3,579,737 | 5/1971 | Gerber | 425/394 |
| 3,632,274 | 11/1972 | Gillespie | 425/395 |
| 3,914,102 | 10/1975 | Brown | 425/397 |
| 3,920,373 | 11/1975 | Brown | 425/397 |
| 4,132,319 | 1/1979 | Padovani | 425/403.1 |
| 4,391,768 | 7/1983 | Arends et al. | 425/384 |

FOREIGN PATENT DOCUMENTS

| | | | |
|---|---|---|---|
| 1291470 | 3/1969 | Fed. Rep. of Germany | 425/397 |
| 1464536 | 12/1966 | France | 425/397 |

Primary Examiner—Jay H. Woo
Assistant Examiner—Scott Bushey
Attorney, Agent, or Firm—Ladas & Parry

[57] ABSTRACT

An apparatus for forming the edge of containers of synthetic thermoplastic material which are open at the top and terminate in an outer flange which is arched upwards from the top and then extends downwards. The apparatus includes an edge moulding unit having four groups of three female moulds and the same number of male moulds, a rotating plate for the female moulds designed to rotate step-by-step to cyclically carry each group of moulds from a charging position, through a moulding position to a discharge position and a cooling position. A feed device having one or more groups of parallel heated screw-threaded rotating rollers are provided, each engaging a portion of the flanges of a sequence of containers in order to heat them and transfer the same from a stock of containers to the charging position. Compressed-air-nozzles are arranged to cause the container to move from the feed device to a female mould.

5 Claims, 4 Drawing Sheets

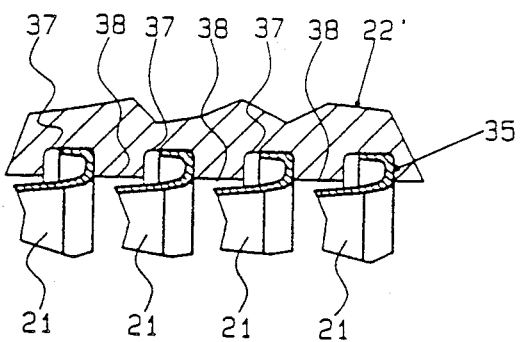
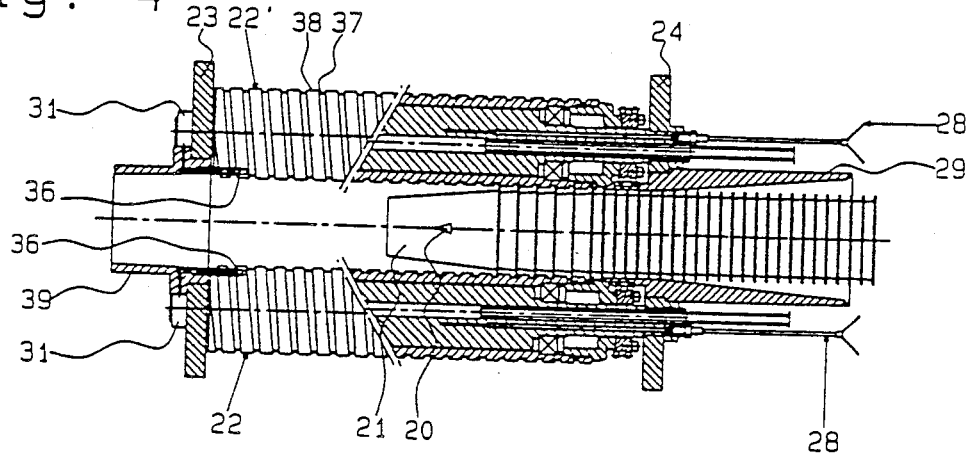
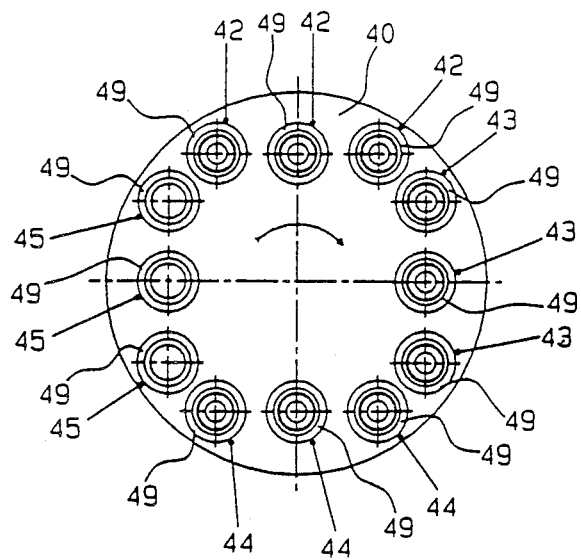

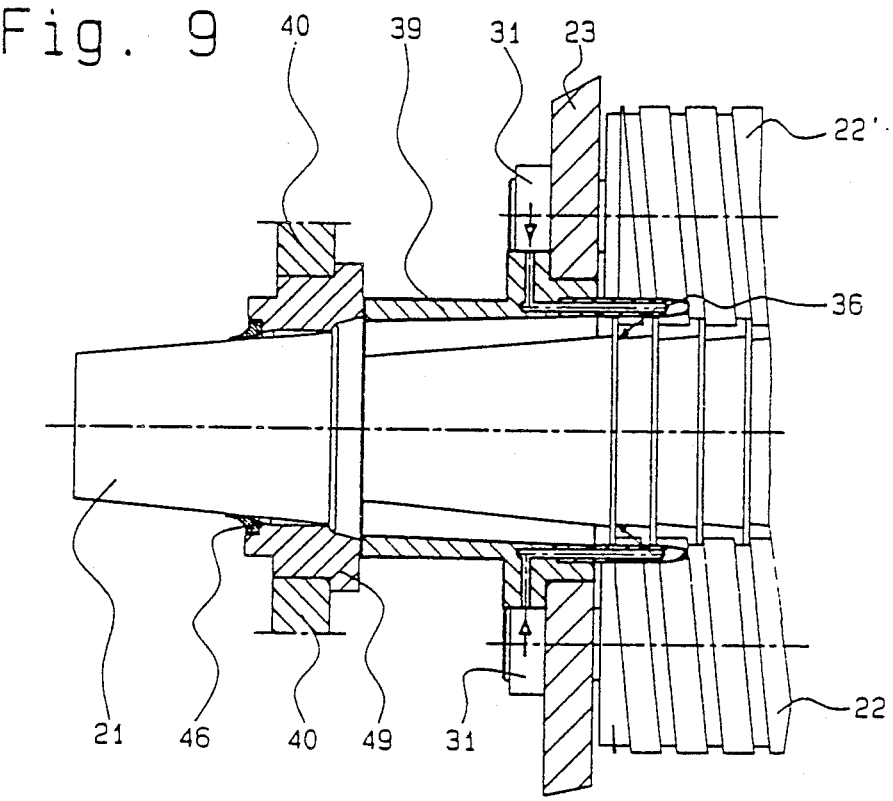
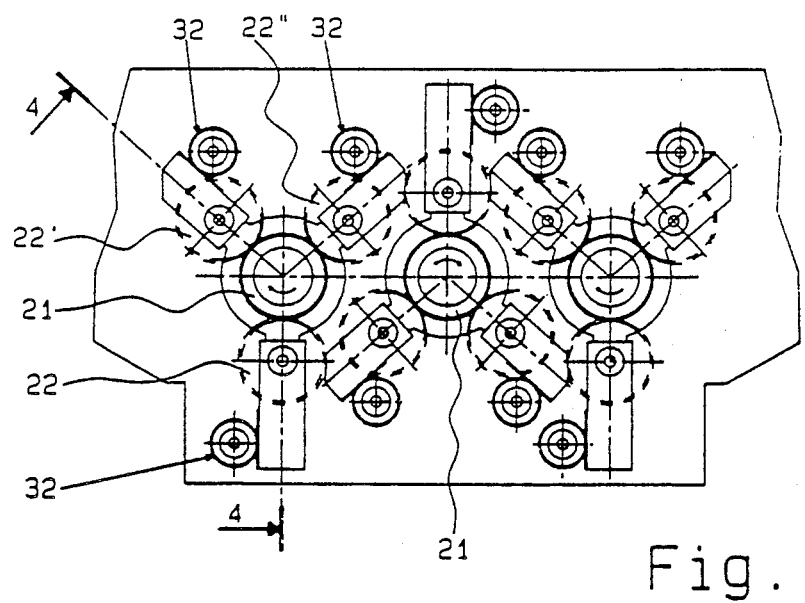

APPARATUS FOR FORMING THE EDGE OF CONTAINERS OF SYNTHETIC THERMOPLASTIC MATERIAL

BACKGROUND OF THE INVENTION

The invention relates to an apparatus for forming the edge of a container of synthetic thermoplastic material which is open at the top and ends in an outer upwardly arched and than downwardly extending flange.

Machines for edging containers of synthetic thermoplastic material which are open at the top and terminate in an outer flange based on the deformation of the said flange which is heated to a temperature such as to render the material plastic by means of several endless screws with threads of variable cross-section are known from British Patent Nos. 951,242 and 1,101,031. By these means, the flange is deformed and rounded into the desired shape by a plurality of edging members which rotate relative to the container which is to be edged.

In these machines heating of the flange is an integral part of the edging cycle, and in the event of the edging members being stopped a plurality of containers remain held between the channels formed by the heating rollers, which because of their high temperature rapidly cause melting of the flanges of the trapped containers, resulting in the presence of molten material between the threads of the said rollers.

In this situation it is necessary to stop the machine for a long period so that the trapped containers can be removed and the threaded rollers can be cleaned.

A further loss of time is involved in returning the threaded rollers to their proper temperature before edging is resumed.

In the edging machines mentioned above, the band which bends and rounds the flange cannot perform its proper function when the thickness of the flange exceeds specific values.

In band edgers, each edging member compresses the flange radially at the points of contact between the flange and the edging rollers, making it difficult to maintain the diameter of the container mouth perfectly circular and the thickness of the edge obtained constant.

With the edging machines mentioned, containers, for example of crystalline polystyrene, do not withstand the torsion due to rotation of the container with respect to the band. This torsion sets up tensions which result in collapse of the material in question. With containers of polypropylene for example, the edging permits easy unrolling of the edge because the latter is not sufficiently stabilised on leaving the machine.

SUMMARY OF THE INVENTION

The primary object of the invention is to make it possible to edge containers of crystalline polystyrene, polypropylene and the like while eliminating the deficiencies of known edging machines.

According to the present invention there is provided an apparatus for forming the edge of containers of synthetic thermoplastic material which are open at the top and terminate in an outer flange which is arched upwards from the top and then extends downwards, the apparatus comprising: an edge moulding unit including at least one female edge mould and a respective male edge mould, a rotating support designed to rotate step-by-step and arranged to carry the or each female mould to cyclically transfer it from a charging position where it is charged with one flanged container through a moulding position where it matches with a respective male mould to deform the flange thereof into a shaped edge, to a discharge position where the or each edged container is unloaded from the edge moulding unit and a cooling position in which each female mould gives off any heat absorbed during the edge forming operation. A feed device, having at least one group of parallel heated screw-threaded rotating rollers angularly spaced from one another, is arranged to engage a respective portion of the flanges of a sequence of flanged containers and to heat them, while transferring the same from stacks of containers to the charging position of the edge moulding unit. Heating means are provided for the screw-threaded rollers, as are nozzle means communicating with a compressed air source and arranged to apply a jet thrust to each heated-flange container delivered by the feed device, to cause the container to enter a female mould in the edge moulding unit.

The apparatus may employ conveyor means arranged upstream of the feed device, designed to convey stacks of containers to each group of screw-threaded rollers of the feed device, and a frame designed to support both the feed device and the conveyor means, the conveyor means being displaceable, in operation, from the moulding unit.

The frame may be pivotable about an axis located at the distal part of the conveyor means and positioned at right angles to the direction of advance of the containers to be edged, thereby being angularly displaceable with respect to the moulding unit to discharge the containers with heated flanges to a receiving device in case of failure of the moulding unit.

The main advantage deriving from the apparatus according to the invention arises from the fact that it is also possible to edge containers of crystalline polystyrene, polypropylene and similar materials.

Another advantage is due to the fact that the apparatus make it possible to manufacture containers with a perfectly circular mouth and with an edge of constant height and thickness.

Another advantage arises from the fact that when special plastics materials are used, such as for example normal polystyrene, the flange heating temperature can be kept below values appropriate to known processes, while in the case of high-impact polystyrene, a material commonly used for the manufacture of beakers for drinks, edging can take place without any heating of the flange, thus providing appreciable energy savings and reducing production costs.

Another advantage arises from the fact that, in the event of a fault or obstruction in the forming station, the means implementing the first four stages can be made to recover the containers, preventing from them becoming trapped and overheated, with the obvious disadvantages deriving therefrom, without therefore interrupting the feed and the heating. Once repair work at the edge forming station has been completed, edging can be resumed immediately, the means implementing the first four stages being returned to their normal working positions.

BRIEF DESCRIPTION OF THE DRAWINGS

The present invention will be further illustrated, by way of example, with reference to the accompanying drawings, in which:

FIG. 3 is a partial cross-sectional view, at right angles to the direction of advance of the containers, of the heating device of the machine of FIG. 1;

FIG. 4 is a view in partial cross-section taken along the line 4—4 of FIG. 3;

FIG. 5 is a partial and magnified cross-sectional view of a detail of FIG. 4;

FIG. 6 is a frontal view of the plate supporting the female moulds in a machine according to the invention;

FIG. 9 is a partial cross-sectional view of the air blowing device for positioning beakers between the female moulds.

DETAILED DESCRIPTION OF THE PREFERRED EMBODIMENTS

Figure 1:
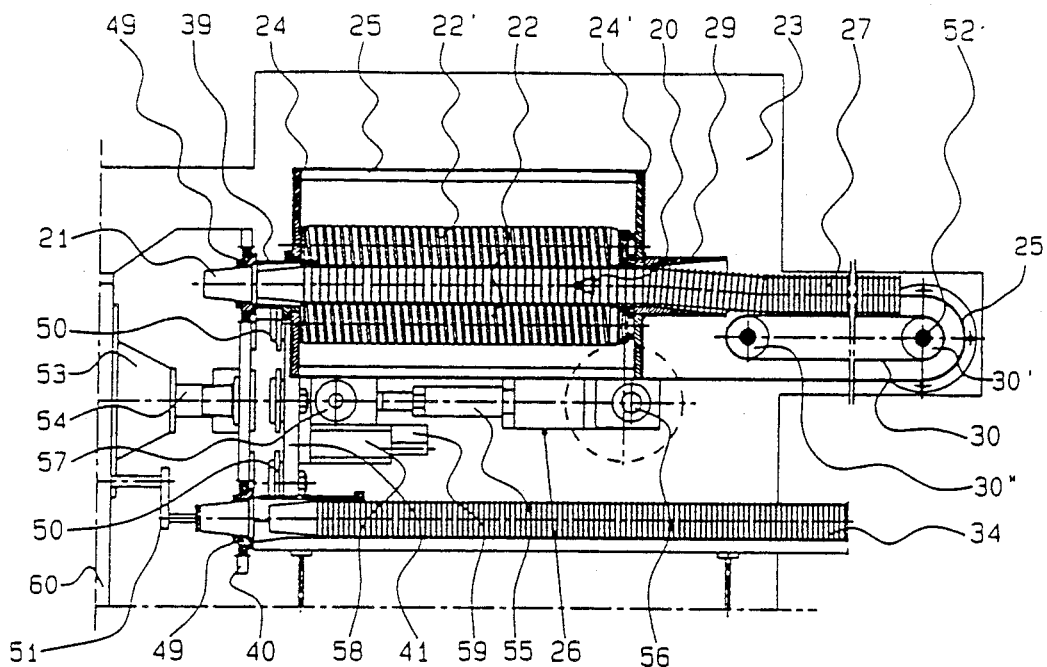
FIG. 1 is a partial cross-sectional view of an edging machine according to the invention with a feed, heating and discharging unit incorporated in the cycle.

Bearing in mind the fact that identical numerical references in the figures correspond to identical or equivalent parts, it will be seen in FIG. 1 that there is a feed device substantially consisting of a conveyor belt 30 mounted on rollers 30' and 30", of which 30' is the driving roller, located at the mouth of the edging machine according to the invention.

Stacks of beakers 27 are supported on this belt and are pushed therefrom between funnels 29 which convey each stack of beakers 27 to a device in which their flanges are heated.

The heating device comprises sets of rollers 22, 22', 22", rotatably supported by means of a moving frame 25, having heads 24, 24', and driven by a motor by means of a suitable means for transferring the motion, such as e.g. belts, chains or gearwheels, which are not shown in the drawing. The rollers in each set are threaded externally so as to form an endless screw, with a thread of constant pitch and cross-section, as may be seen in FIGS. 4 and 5, with a flat crest 38 and a flat-bottomed root 37. The pitch of these threads is greater than the stacking pitch of beakers 27 located on belt 30.

Although not illustrated in the drawings, the pitch of these threads may be identical to that for the stacking of beakers 27 and may increase in the final portion of the said sets of rollers so as to separate at least top container 21 from a stack of remaining containers, in order to aid removal of the top container at the end of the heating stage.

As will be seen in FIG. 5, cavity 37 of the screw has dimensions such as to contain flange 35 which is to be edged, whereby the beakers are taken up one at a time and removed from the others in the stack.

Each cylinder 22, 22', 22" is attached to a thermocouple 28 capable of heating the entire roller to its outer surface. The amount of heat supplied is sufficient also to heat the flange of beakers which may be constructed of polypropylene or other complex plastics materials which are not sufficiently deformable at moderate temperatures.

As will be seen in FIG. 3, the axes of the rollers in these sets are placed symmetrically and at a spacing which can be adjusted by means of rack regulators 32 in such a way that the three sets of beakers 21 are aligned. The rotation of heating cylinders 22, 22', 22" causes the entire beaker to rotate about its own longitudinal axis so that the point of contact between the threads of the three rollers and flange 35 of the beaker continuously changes, and thus the entire flange is heated by the time it leaves the endless screw.

As will be seen in FIG. 9, beakers 21 are removed from the outlet of the threaded roller heating device by means of a jet of compressed air from three nozzles 36 located parallel to the longitudinal axis of the beakers being edged and connected to an air compressor which is not illustrated in the drawing. The pressure of the air in the nozzles is a minimum, given that the beakers have already been separated from the remainder still being heated. These air jets are directed radially and in the direction of advance indicated by arrow 20 in FIG. 4, in such a way as to pass into the space separating top container 21 from the others being heated, creating a greater pressure on the inside of the base of the beaker than that acting on the outside of the said base. Under the effect of this thrust beakers 21 enter female moulds 49 of the edging device, which as may be seen in FIGS. 1 and 2 consists of two plates 40 and 41.

Circular plate 40 bears 12 female moulds while plate 41 bears 3 male moulds 50.

Female moulds 49 are distributed in groups of three along the sides of a square whose centre coincides with the axis of rotation of the said plate. On the top side of the square are located the three positions 42 for entry into the female moulds, on the right hand side are the three positions 43 for the forming of the edge, at the base there are the three positions 44 for removal, and on the left hand side there are finally the three positions 45 of the female moulds which remain always empty and are cooled by natural or forced loss of the heat absorbed during forming and stabilisation of the edge.

By means of a continuous succession of partial rotations of a quarter turn of plate 40 pressed onto shaft 54, connected by means of a support 53 to a reduction gear mechanism 60 driven by a motor which is not illustrated, each set of female moulds is carried cyclicly through the various positions into position 43 for forming the edge opposite a set of male moulds 50. The said male moulds move in an alternating way along their own axial direction driven by an eccentric device 26 via a connecting rod 55 of adjustable length of which one end is attached to pin 57 and by means of supports 58 of plate 41 which bears male moulds 50. Said supports 58 slide between guides 59 integral with fixed frame 23 which also supports moving frame 24, 24', 25.

Figure 7:
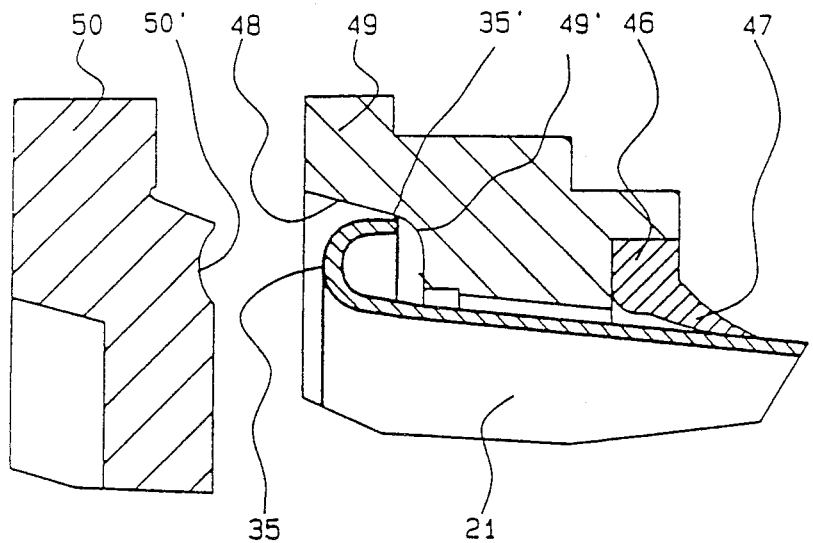
FIG. 7 is a partial cross-sectional view of a male mould and a female mould open with a beaker positioned for edging.

Internally, and downstream of the forming surfaces, as may be seen in FIGS. 7 and 9, each female mould is provided with a sealing member 46 consisting of a ring having an elastically deformable lip 47 which projects towards the interior of the said mould. When in the resting position, the minimum circumference of this lip is slightly less than that of the corresponding portion of the glass against which the seal is made, while in the stressed condition it adopts the same dimension as the circumference of the portion of glass with which it is in contact.

Beaker 21, substantially frustoconical shape, driven by the air blasts from nozzles 36, enters the female mould and is positioned as illustrated in FIG. 7, i.e. with one end 35' of flange 35 almost in contact with profile 48 of the female mould.

Said ring 46 together with lip 47 holds the beaker in position during the stage in which plate 40 rotates, transferring the beakers from delivery position 42 to forming positions 43 and subsequently from these to expulsion positions 44.

In order to prevent the beakers from taking up undesirable positions during the positioning stage, and obstructing the machine at the outlet from the flange heating zone, three guide rollers 39 ensuring correct lateral movement of the beakers are provided and are integral with plate 24 of movable frame 25 which supports both the feed device and the flange heating device.

Once three beakers 21 have been positioned between the female moulds 49 which are located in position 42, plate 40 makes a first quarter turn rotation, transferring the moulds and the corresponding beakers to position 43 and moving the set of empty moulds 49 from position 45 to 42.

Closure of the male moulds 50 onto female moulds 49 takes place when the female moulds are in position 43 and brings about mechanical deformation of the flanges by compression, while a further set of top beakers 27 are positioned in moulds 49 which have reached position 42.

Figure 8:
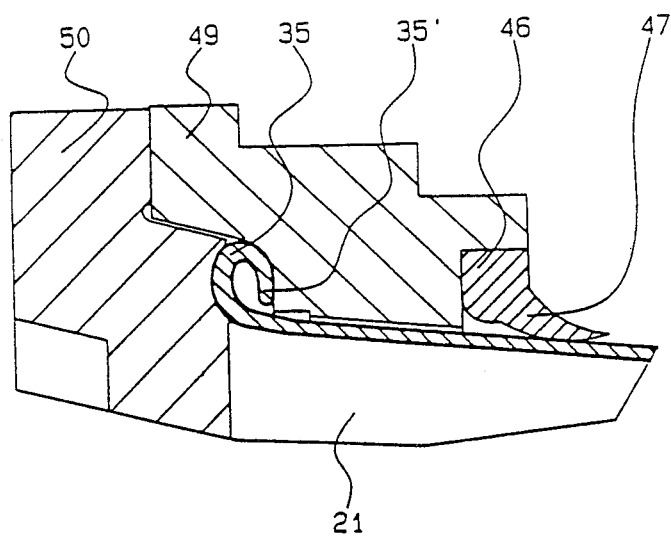
FIG. 8 is a similar view to the above, with the moulds closed and the beaker edged.

Male moulds 50 with their annular recesses 50', see FIG. 7 and 8, compress the arched portion towards the top of flange 35 and cause beakers 27 to advance axially between the holes in female moulds 49. As the beakers advance in the holes of the moulds lip circumference 47 increases in diameter and has a maximum diameter when the beakers cease to advance. During this entry of beakers 27 into the female moulds, flange 35, the outer edge of whose extremity 35' is in contact with profile 48 of female mould 49, is stressed by the annular taper 49' of profile 48 of the female mould and by the compression exerted by annular recesses 50' of the male mould so as to bend inwardly in order to take up the final position illustrated in FIG. 8, where moulds 49 and 50 are shown completely closed.

From what has been said it will be clear that the combined compressive effect mainly exerted by annular recess 50' and by taper 49' acts simultaneously over the entire outer surface of flange 35. As a consequence a strong cooling effect which finally stabilised the entire edge acts over the full surface of the flange.

The mouth diameter of a container whose edge has been obtained as described above must correspond exactly to the diameter imposed by the male mould with its annular recess 50', while the height of this edge cannot be different from that imposed by the male and female moulds which close upon each other, as may be seen in FIG. 8.

These characteristics of dimensional homogeneity in containers edged and described above are particularly important when the containers, e.g. beakers, must be used in drinks distribution machines because they assist delivery of the beakers stacked within the distribution machines without any possibility of obstruction. The same applies to containers, e.g. pots, containing yogurt and the like used in automatic filling and sealing machines.

In the edging machines described in British Patent Nos. 951,242 and 1,101,031, the compression and cooling effects exerted on flanges of the containers take place only by means of rolling contact at the points of contact between the threaded rollers and the flanges, with consequently limited effects. On the other hand, according to this invention, the compression and cooling effects exerted on the flanges of the containers take place as a result of almost static contact over the entire surface of each flange substantially corresponding to the forming surfaces of the male and female moulds, with effects which are far superior to those provided by the known art.

Practical tests have demonstrated that simultaneous compression over the entire surface of the flange makes it possible to edge flanges of appreciable thickness, even when they are made of materials which are particularly resistant to being worked, which cannot be rolled using threaded roller edging members.

When edging is complete, moulds 49 and 50 are opened so as to allow moulds 49 to be moved from positions 43 to 44 by means of a further quarter turn rotation of plate 40.

While moulds 49 remain in positions 44, an expulsion device indicated generically by 51 projects edged containers 34 from moulds 49 pushing them out of rings 46 whose lips 47 elastically return their initial shape, ready to accept new beakers for a subsequent edging cycle. Expulsion device 51 then causes edged containers 47 to enter stacking channels in order to be subsequently sent to store.

Although not illustrated in the drawing, sealing ring 46 may be replaced by a plurality of annular sectors having the same function as the entire ring, without going beyond the scope of possible embodiments of the invention.

A further 90° rotation of plate 40 brings mould 49, freed from edged containers, into positions 45. While in positions 45, although not illustrated in the drawing, moulds 49 may easily be subjected to forced cooling, for example by means of jets of cold air, where particular operating requirements necessitate it.

A further 90° rotation of plate 40 returns moulds 49 to positions 42 from which they started and while the moulds remain in these positions new containers 21 are positioned to start a new edge forming cycle.

Figure 2:
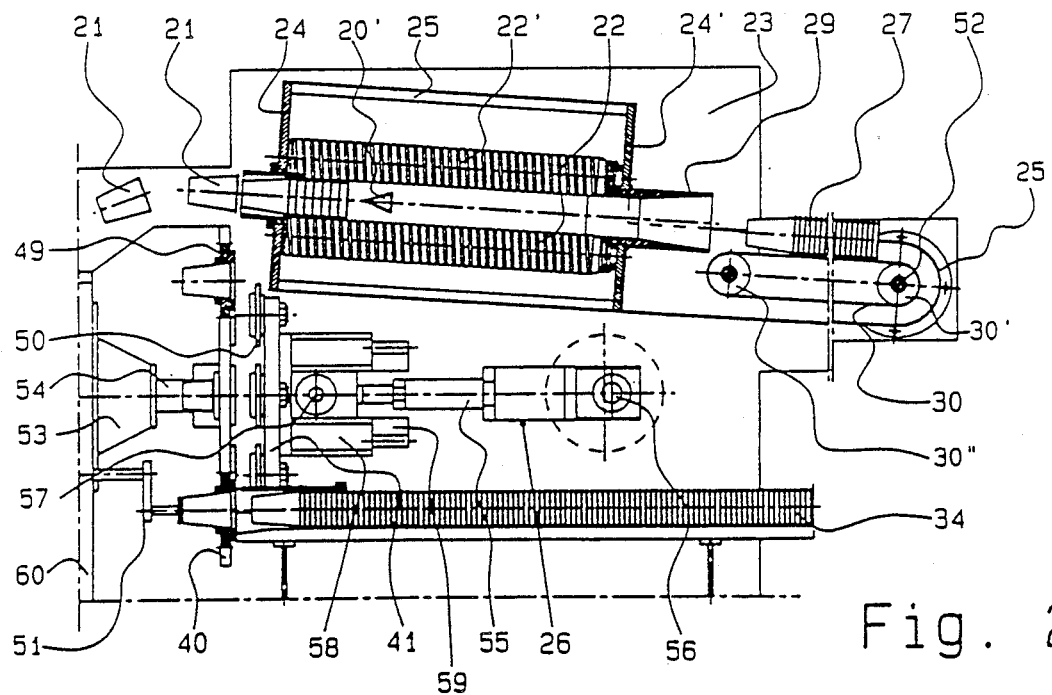
FIG. 2 is a partial cross-sectional view of the machine of FIG. 1 with the feed, heating and discharging unit isolated from the cycle.

In the machine according to the invention illustrated in FIGS. 1 and 2, means effecting the first four stages of the process are supported on a movable frame 25 to the heads 24 and 24' of which heating rollers 22, 22', 22" are secured by means of removable bolts 31, 33, while behind head 24' again of said movable frame 25 is mounted feed device 30, 30', 30". Said frame 25 can be moved by any known means from the normal operating position illustrated in FIG. 1 about an axis 52 to adopt the position illustrated in FIG. 2.

The feed direction indicated by arrow 20 in FIG. 1 then changes to the direction indicated arrow 20' in FIG. 2, whereby beakers 21 leaving heating channels 22, 22', 22" are pushed by the air jets from nozzles 36 onto plate 40.

As a result of the ability of the feed and heating unit to rotate about axis 52, the stages of feeding, heating and removing top containers 21 can be separated from the remaining edging stages. By this means, if small faults occur in the edge forming device the said stages can be kept in operation while the edge forming device is stopped. In this case the objects which are to be edged, which in the meanwhile continue to flow through the heating zone, are discharged into a suitable recovery container, or enter stacking channels which are not illustrated in the drawing.

This also makes it possible to maintain the flange temperature of the glass which are to be edged within values such that the subsequent edging stage can be resumed immediately the fault has been repaired, during short stoppages.

In the event of a prolonged stoppage due for example to faults which cannot immediately be repaired the feed to the edge heating device is taken off line, while the objects located between the heating rollers continue to advance. By this means the said rollers are completely emptied, and the objects located in the heating device are recovered.

I claim:

1. An apparatus for forming an edge of containers of synthetic thermoplastic material which are open at a top and terminate in an outer flange which is arched upwards from the top and then extends downwards, the apparatus comprising:

an edge moulding unit including at least one female edge mould and a respective male edge mould, and a rotating support designed to rotate step-by-step and arranged to carry the or each female mould to cyclically transfer it from a charging position where it is charged with one flanged container, through a moulding position where it matches with a respective male mould to deform the flange thereof into a shaped edge, to a discharge position where the or each edge container is unloaded from said edge moulding unit, and to a cooling position in which each female mould gives off any heat absorbed during the edge forming operation;

a feed device having at least one group of parallel heated screw-threaded rotating rollers angularly spaced from one another and arranged to engage a respective portion of the flanges of a sequence of flanged containers and to heat them, while transferring the same from stacks of containers to said charging position of said edge moulding unit;

heating means for heating said screw-threaded rollers; and nozzle means communicating with a compressed air source and arranged to apply a jet thrust to each heated-flange container delivered by said feed device, to cause the container to enter a female mould in the edge moulding unit.

2. An apparatus as claimed in claim 1, wherein the or each female mould comprises front flange-engaging and edge forming surfaces and rear retaining means having an elastically deformable annular lip arranged to engage an outer surface of a container seated in the female mould to hold it in position.

3. An apparatus as claimed in claim 2, wherein said retaining means comprises a plurality of annular sectors projecting towards an interior of the female mould, each provided with an elastically deformable lip.

4. An apparatus as claimed in claim 2, further comprising conveyor means arranged upstream of said feed device and designed to convey, toward its downstream distal end, stacks of containers to each group of screw-threaded rollers of said feed device, and a frame designed to support both said feed device and said conveyor means, said conveyor means being displaceable, in operation, from said edge molding unit.

5. An apparatus as claimed in claim 4, wherein said frame is pivoted about an axis located at the distal end of the conveyor means and positioned at right angles to a direction of advance of the containers to be edged, thereby being angularly displaceable with respect to the moulding unit to discharge the containers with heated flanges to a recovery means in case of failure of the moulding unit.

* * * * *